June 10, 1941.　　P. A. E. HELLIGE　　2,244,839
COLORIMETER
Filed Feb. 17, 1940　　3 Sheets-Sheet 2
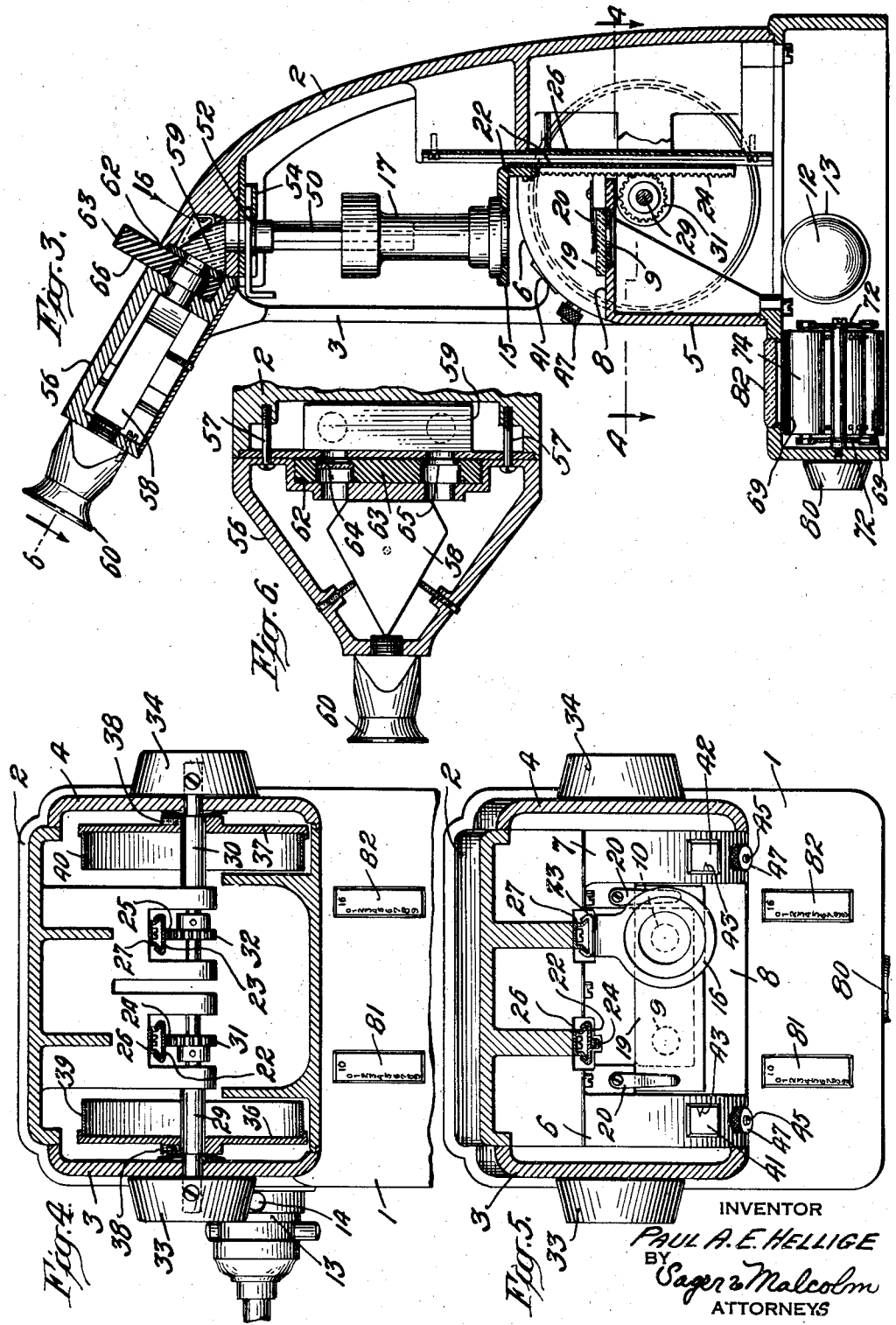
INVENTOR
PAUL A. E. HELLIGE
BY Sager & Malcolm
ATTORNEYS June 10, 1941.  P. A. E. HELLIGE  2,244,839
COLORIMETER
Filed Feb. 17, 1940   3 Sheets-Sheet 3

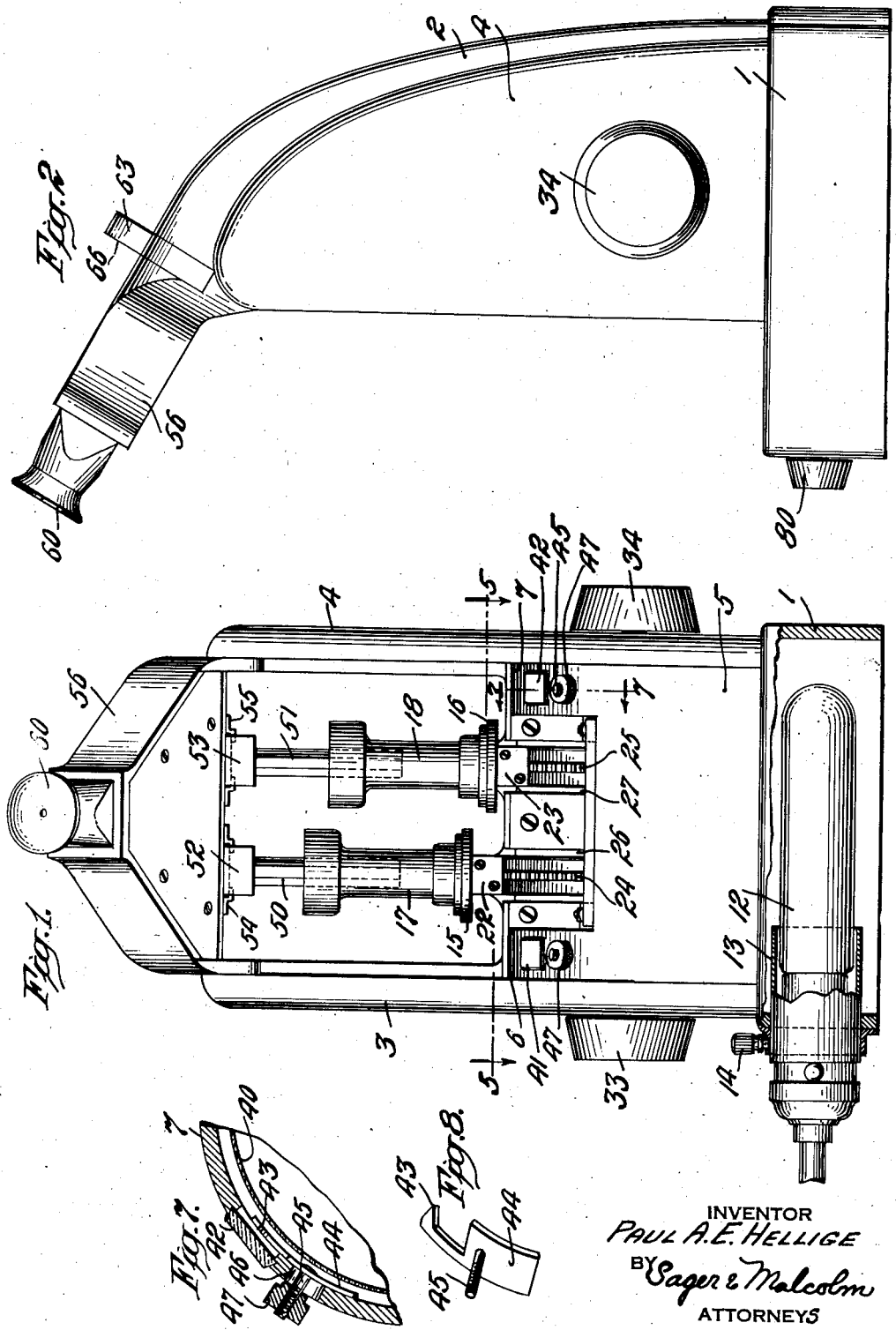

INVENTOR
PAUL A. E. HELLIGE
BY Sager & Malcolm
ATTORNEYS

Patented June 10, 1941

2,244,839

UNITED STATES PATENT OFFICE 2,244,839

COLORIMETER

Paul A. E. Hellige, Jackson Heights, N. Y.

Application February 17, 1940, Serial No. 319,439

6 Claims. (Cl. 88—14)

This invention relates to colorimeters such as are used in the examination and analysis of colored liquids, bacterial solutions, and chemical mixtures in liquid form.

The objects of the invention are to simplify the construction and operation of instruments of this type, to facilitate rapid and accurate readings, and to reduce the strain on the operator's eyes as well as the time and labor required to operate the device.

The invention is particularly concerned with colorimeters of the type disclosed in my Patent #1,870,624, issued August 9, 1932, having a pair of adjustable stages for supporting the usual standard and test solutions, and means including an eyepiece for comparing the colors of the solutions at various depths. In making an analysis the operator adjusts one or both of these stages containing the standard and test solutions until the two bands of color viewed through the eyepiece become equal in intensity, whereupon readings are taken from scales associated with the two stages, and, for certain purposes such as the determination of haemoglobin, these readings are referred to a conversion chart or table which is mounted either in the base of the colorimeter or is otherwise available to the operator.

The principal feature of the present invention resides in so constructing a colorimeter of the above type that all necessary operations, from the time the solutions are placed in the device until the final reading is taken, may be performed easily and quickly without requiring the operator to shift his position or even turn his head from the general position of the eyepiece.

For convenience and speedy operation, the scales which indicate the liquid depths of both the standard and test solutions are carried by rotatable drums which are so placed that they face the operator and can easily be read from the general position of the eyepiece. The scales carried by these drums may be such as to indicate the liquid depth, or they may be calibrated for a direct reading of the values for various purposes such as the determination of haemoglobin, blood sugar, albumen, etc. The drums are preferably illuminated by a suitable lamp which is mounted in the hollow base of the colorimeter and which also provides the light for the standard and test solutions.

The arrangement of the stages for holding the liquid cups, the plungers associated therewith, and a daylight filter plate which is mounted beneath the stages, is such that, like the eyepiece and the scale drums, they all face the operator, thus enabling a convenient handling of these parts, and, in regard to the filter plate, its cleaning. This arrangement makes it unnecessary for the operator to reach around the frame of the colorimeter to remove the cups, and it enables the body of the operator to protect the solutions from interfering light.

The windows through which the readings on the drums are obtained are provided with adjustable index points, which allows a quick adjustment for any irregularity in the length of the plungers or thickness of the bottoms of the cups holding the standard and test solutions. These windows are so located that the readings can be made from the same eye position from which the color comparison is made.

Another feature of the invention resides in the provision of a slot or receptacle in the upper part of the colorimeter for the insertion of plates containing color standards of glass or the like into the field of the lens system, which color standards are frequently used in place of a standard solution. The arrangement of these color-standard plates, with a suitable nameplate on each for identification of the standard, is such that the name is readable from the same eye position from which the color fields are observed.

Still another feature of the invention resides in the provision of a novel conversion chart in the base of the colorimeter, which is preferably illuminated by the single source of light therein and is also observable from the same position from which all other operations and readings are made, and which may be operated with minimum expenditure of time and effort.

These and other features and advantages of the invention will be described in connection with the accompanying drawings, in which:

Fig. 1 is a front elevation of a colorimeter embodying the invention;

Fig. 2 is a side view thereof;

Fig. 3 is a vertical section through the colorimeter;

Fig. 4 is a transverse section taken on the line 4—4 of Fig. 3;

Fig. 5 is a transverse section on the line 5—5 of Fig. 1;

Fig. 6 is a transverse section through the lens system, taken on line 6—6 of Fig. 3;

Fig. 7 is a sectional view taken on line 7—7 of Fig. 1, showing the adjustable index points on the windows through which the drum readings are taken;

Fig. 8 is a detail view showing one of the adjustable index points;

Figure 9:
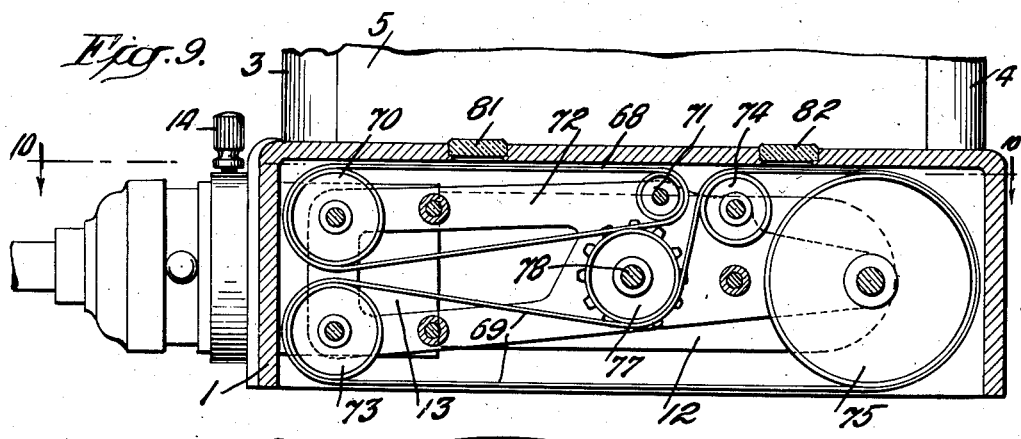
Fig. 9 is a vertical section taken on line 9—9 of Fig. 10, showing the construction of the conversion chart in the base of the colorimeter.

As shown in the drawings, the frame of the colorimeter consists of a hollow enclosed base 1, a rear wall 2, side walls 3 and 4, and a short front wall or plate 5 having its end portions 6 and 7 adjacent the side walls 3 and 4 curved in conformity with the scale drums presently to be described and having a central horizontal top flange 8 provided with circular openings 9 and 10 directly beneath the adjustable stages which are adapted to hold the standard and test solutions. The base 1 contains an elongated light bulb 12 supported by a cylindrical sheath 13 which is fitted into the base and secured therein as by means of the thumb screw 14 shown in Fig. 1.

The standard and test solutions are supported on annular stages or platforms 15 and 16, respectively, which may be moved up and down independently. Since these stages are recessed or ring-shaped, they allow light rays from the bulb 12 to pass up through the openings 9 and 10 in the front plate 5 and through the glass cups 17 and 18 which contain the standard and test solutions. A daylight filter plate 19 is preferably mounted on the top flange 8 of the front plate 5 above the openings 9 and 10 in said flange, and is held thereon by spring clips 20, for the purpose of filtering the light rays passing through the standard and test solutions.

The stages 15 and 16 for the standard and test solutions are supported on brackets 22 and 23 having depending toothed racks 24 and 25, respectively, which are slidably mounted on vertical tracks 26 and 27 secured to flanges on the rear wall 2 of the colorimeter.

Horizontal shafts 29 and 30, extending through the respective side walls 3 and 4 of the frame as shown in Fig. 4, carry pinions 31 and 32 which mesh with the respective racks 24 and 25 for the purpose of raising and lowering the stages 15 and 16 supporting the standard and test solutions. The shafts 29 and 30 are rotated by means of knobs 33 and 34 which are conveniently located on opposite sides of the colorimeter within easy reach of the operator.

Figure 11:
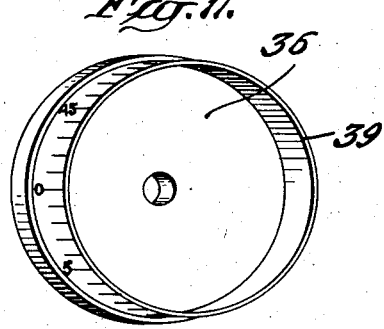
Fig. 11 is a perspective view illustrating the construction of the drums containing the scales for the standard and test solutions.

The rotatable shafts 29 and 30 carry discs 36 and 37 which are secured thereto by set screws 38 as shown in Fig. 4. The discs 36 and 37 carry annular drums or flanges 39 and 40, respectively, bearing suitable scales which, for purposes of illustration, are calibrated from "0" to "50" divided in fifths, as shown in Fig. 11. The calibrated drums 39 and 40 may be made of any suitable material, but I prefer to make them translucent and of different contrasting colors to enable the two to be more readily distinguished. Of course the scales on the drums may be calibrated in any desired manner to provide readings of the liquid depths, or they may be calibrated for direct readings of the values for various purposes such as the determination of haemoglobin, blood sugar, albumen, etc.

The calibrated drums 39 and 40 are positioned within the respective curved end portions 6 and 7 of the front wall 5 of the instrument, as will be seen from Figs. 3–5, and these curved end portions of the front wall are provided with transparent windows 41 and 42, respectively, which are conveniently located in a position to be readily viewed from the front of the colorimeter as best shown in Figs. 1, 3 and 5. These windows are provided with adjustable index points 43 carried by segments 44 which are curved to conform to the contour of the end portions 6 and 7 of the front wall as shown in Figs. 7 and 8. The segments 44 are positioned within the curved walls 6 and 7 adjacent the respective drums 39 and 40, and they carry screws 45 which project outwardly through slightly elongated arcuate slots 46 in said curved walls, the screws 45 being provided with threaded heads or nuts 47 by means of which they may be tightened in any adjusted position. The arcuate slots 46 extend in the direction of rotation of the respective drums 39 and 40, hence a slight movement of the segments 44 and index points 43 in either direction permits a quick and accurate adjustment for any irregularities in the thickness of the bottoms of the cups 17 and 18 or any irregularity in the length of the plungers which are moved up and down in said cups as will now be described.

A pair of hollow or solid plungers or tubes 50 and 51 are attached to plates 52 and 53, respectively, which are slipped into tracks 54 and 55 on the upper wall of the colorimeter so that the plungers 50 and 51 project downwardly parallel to each other directly over the open central portions of the annular stages 15 and 16, respectively, as shown in Figs. 1 and 3. The plungers 50 and 51 are of the usual type made of white solid glass or of black or white glass tubing, having fused plane plates at their upper and lower ends.

A casing 56 is secured to the top of the colorimeter frame by means of screws 57, and contains the usual prisms 58 and 59 so arranged that light rays passing through the standard and test solutions, and through plungers 50 and 51, are reflected into the color observing eyepiece 60. The casing 56 is set at an angle to the frame of the colorimeter so that the eyepiece 60 projects well toward the front of the instrument as best shown in Figs. 2 and 3. Due to this construction the operator, by merely shifting his gaze from the eyepiece 60, but without so much as turning his head, may observe the readings of the scales on drums 39 and 40 through windows 41 and 42. The casing 56 has a transverse slot or receptacle 62 in the upper face thereof for the reception of any one of a number of color-standard plates 63 as shown in Figs. 2, 3 and 6. The color-standard plate 63 has a colored glass 64 representing any desired color standard adapted to take the place of the standard solution 17 as required, and it has an opening 65 permitting the transmission of light from the test solution to the color-observing eyepiece 60. The upper front face 66 of each color-standard plate 63 preferably contains a suitable nameplate which is readily visible and identifiable from the general position of the eyepiece 60.

Figure 10:
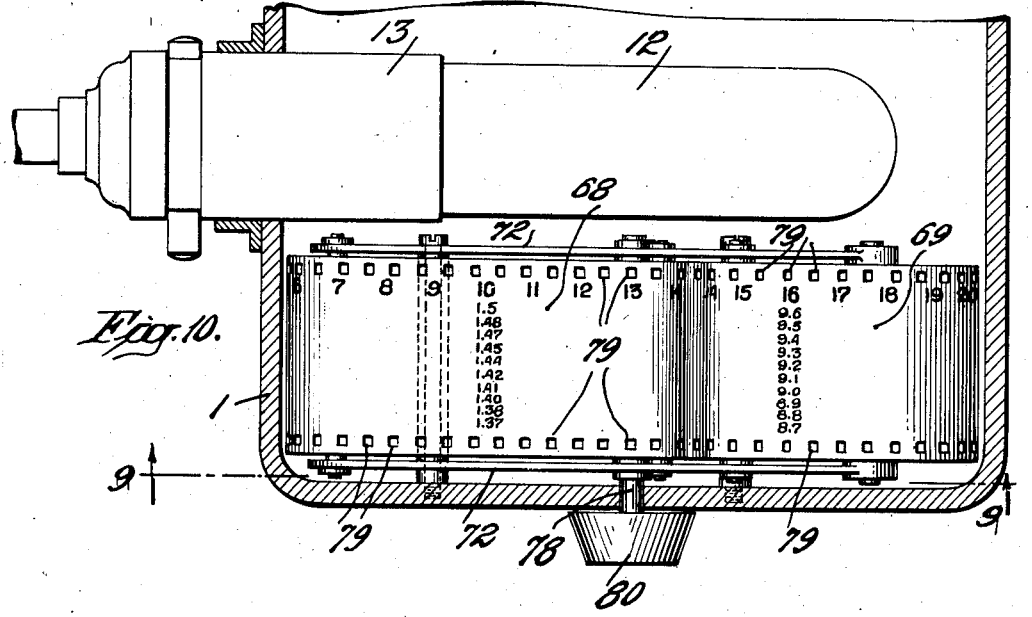
Fig. 10 is a horizontal section taken on line 10—10 of Fig. 9, showing said conversion chart.

A movable conversion chart of novel construction may be mounted in the hollow base 1 of the colorimeter for the purpose of indicating various relations between the readings of the scale drums 39 and 40. As shown in Figs. 9 and 10, the chart comprises two endless bands 68 and 69 which may be of transparent or translucent material such as ordinary motion picture film, the two bands preferably being of contrasting colors. The band 68 is mounted on rotatable spools 70 and 71 which are journaled in frame members 72 in the hollow base 1, while the band 69 is mounted on rotatable spools 73, 74 and 75, which are similarly journaled in said frame members as best shown in Fig. 9. A common sprocket wheel 77, mounted on a rotatable shaft 78 which extends out through the front of the base 1, is provided with teeth engaging perforations 79 adjacent the edges of the bands 68 and 69. An operating knob 80 is keyed to the shaft 78 at the front of the colorimeter as shown in Figs. 2, 3, 5 and 10.

The bands 68 and 69 contain suitable scales which are observable through windows 81 and 82, respectively, which are mounted in the top of the base 1 as best shown in Figs. 4, 5 and 9. One of these scales would usually be used for converting the ratio of liquid depth, and the other for any desired purpose such as haemoglobin readings, in order to obtain the result directly from the liquid depth of the test solution. It has heretofore been proposed to accomplish a similar result by employing a single elongated band containing a scale for the conversion ratio as well as a scale for the specific method. However, such arrangement requires an extremely long band and requires a considerable number of turns of the actuating knob in order to switch from one table to the other, which disadvantages are avoided by my improved construction.

The invention claimed is:

1. A colorimeter comprising a frame, a pair of vertically movable stages on said frame for supporting standard and test solutions, means including an eyepiece at the top of said frame for comparing the color of said solutions, means including a pair of independent rotatable shafts mounted on said frame for raising and lowering said stages, separate rotatable drums actuated by said shafts, said drums being located in the direct line of vision from the general observation position of said eyepiece and containing calibrations readable from said observation position so that the eyepiece and the calibrations on said drums may be viewed without substantial shifting in eye position, and means for directing light from a common source at the bottom of said frame underneath said stages and upon the calibrations of said rotatable drums to illuminate same.

2. A colorimeter comprising a frame having a back wall and side walls, a pair of vertically movable stages on the front of said back wall for supporting standard and test solutions, means including a forwardly inclined eyepiece mounted at the top of said frame and projecting forwardly beyond said back wall for comparing the color of said solutions, a pair of independent rotatable shafts extending through opposite side walls of said frame and having operating means readily accessible from the front of said frame, means actuated by the respective shafts for raising and lowering said stages, drums carried by said shafts, said drums being located in the direct line of vision from the general observation position of said eyepiece and containing calibrations readable from said observation position so that the eyepiece and the calibrations on said drums may be viewed without substantial shifting in eye position, and a lamp at the bottom of said frame in position to illuminate said stages and the calibrations on said drums.

3. A colorimeter comprising a frame, a pair of vertically movable stages on said frame for supporting standard and test solutions, an optical system including a color observing eyepiece mounted on the top of said frame and sloping well toward the front thereof to a convenient observation position for comparing the color of said solutions, a receptacle in said optical system for the reception of a color-standard plate identifiable from said observation position, a pair of independent rotatable shafts carried on said frame and having operating means readily accessible from the front of said frame, means actuated by the respective shafts for raising and lowering said stages, drums carried by said shafts, said drums being located in the direct line of vision from the general observation position of said eyepiece and containing calibrations readable from said observation position so that the eyepiece and the calibrations on said drums may be viewed without substantial shifting in eye position, and a lamp at the bottom of said frame underneath said stages and said drums in position to illuminate same.

4. A colorimeter comprising a frame having an enclosed lower portion, a pair of vertically movable stages on the front of said frame above said enclosed lower portion for supporting standard and test solutions, means including an eyepiece mounted on the top of said frame and projecting well toward the front thereof for comparing the color of said solutions, a pair of independent rotatable shafts in the enclosed lower portion of said frame extending through opposite sides of the frame and having operating means readily accessible from the front of said frame, means actuated by the respective shafts for raising and lowering said stages, calibrated drums carried by said shafts within the enclosed lower portion of said frame adjacent the respective sides thereof, windows in the enclosed lower portion of said frame adjacent the respective drums for reading said calibrations from the general position of said eyepiece, index points between said windows and said drums adjustable in the direction of rotation of said drums, and means for directing light from within the enclosed lower portion of said frame underneath said stages and upon said drums to illuminate same.

5. A colorimeter comprising a hollow base, a frame mounted thereon, a pair of vertically movable stages on said frame for supporting standard and test solutions, means including an eyepiece at the top of said frame for comparing the color of said solutions, means including a pair of independent rotatable shafts mounted on said frame for raising and lowering said stages, separate rotatable drums actuated by said shafts, said drums being located in the direct line of vision from the general observation position of said eyepiece and containing calibrations readable from said observation position so that the eyepiece and the calibrations on said drums may be viewed without substantial shifting in eye position, a pair of endless bands movably mounted on said base and containing indicia for indicating relations between said standard and test solutions, means at the front of said base for operating said endless bands in unison, windows in said base adjacent said endless bands for reading said indicia from said observation position, a lamp in said base for illuminating said endless bands, and means for directing light from said lamp underneath said stages and upon the calibrations on said rotatable drums to illuminate same.

6. A colorimeter comprising a frame having an enclosed lower portion, a pair of vertically movable stages on the front of said frame above said enclosed lower portion for supporting standard and test solutions, means including an eyepiece mounted on the top of said frame and projecting well toward the front thereof for comparing the color of said solutions, a pair of independent rotatable shafts in the enclosed lower portion of said frame extending through opposite sides of the frame and having operating means readily accessible from the front of said frame, means actuated by the respective shafts for raising and lowering said stages, calibrated drums carried by said shafts within the enclosed lower portion of said frame adjacent the respective sides thereof, windows in the enclosed lower portion of said frame adjacent the respective drums for reading said calibrations from the general position of said eyepiece, and a lamp in the enclosed lower portion of said frame underneath said stages and said drums in position to illuminate same.

PAUL A. E. HELLIGE.